United States Patent [19]
Newman

[11] Patent Number: 5,491,366
[45] Date of Patent: Feb. 13, 1996

[54] LEAK PREVENTION IN UNDERWATER POWER GENERATION

[76] Inventor: Edwin Newman, 10331 Lindley Ave. #113, Northridge, Calif. 91326

[21] Appl. No.: 202,993

[22] Filed: Feb. 28, 1994

[51] Int. Cl.$^6$ ..................................................... F03B 13/10
[52] U.S. Cl. ................... 290/53; 290/54; 290/43; 322/4
[58] Field of Search ................... 290/42, 43, 53, 290/54; 415/7; 416/84

[56] References Cited

U.S. PATENT DOCUMENTS

| | | | |
|---|---|---|---|
| 3,928,771 | 12/1975 | Straumsnes | 290/43 |
| 4,026,587 | 5/1977 | Hultman et al. | 290/53 |
| 4,256,970 | 3/1981 | Tomassini | 290/53 |
| 4,335,319 | 6/1982 | Mettersheimer, Jr. | 290/54 |
| 4,383,182 | 5/1983 | Bowley | 290/43 |
| 4,520,273 | 5/1985 | Rowe | 290/54 |
| 5,066,867 | 11/1991 | Shim | 290/53 |
| 5,324,988 | 6/1994 | Newman | 290/54 |

*Primary Examiner*—Thomas M. Dougherty
*Assistant Examiner*—Nicholas Ponomarenko

[57] ABSTRACT

A system for generating electric power using internal waves and currents of oceans and rivers against a bag structure mounted moveably on a tower fixed to the ocean or river bottom. The bag structure is filled with compressed water and surrounds the support tower. Arranged around a central hole in the bag structure are located numerous gears which mesh with racks mounted horizontally around the bag structure's central hole circumference.

Movement of the internal waves or currents of a surrounding ocean or river cause the bag to rotate and move vertically up and down, turning generator armatures attached directly or indirectly to the bag and tower producing electrical power. Assuming a river moves at 0.82 meters/sec. and the bag structure measures 50 meters diameter and 6 meters deep with a vertical core hole 15 meters diameter the moment of inertia is then 3,497,812,500 kilogram meters and the angular momentum therefor is 115 megawatts with about 10 megawatts lost to friction. A system as described in the invention, standing in the Detroit River could produce over 105 megawatts of electric power, cleanly and at an economic cost per kilowatt-hour.

6 Claims, 2 Drawing Sheets

LEAK PREVENTION IN UNDERWATER POWER GENERATION

BACKGROUND OF THE INVENTION

1. Field of the Invention

This invention improves U.S. Pat. No. 5,324,988 issued Jun. 28, 1994 to E. Newman which describes an underwater power generation system. More particularly it relates to an alternative power takeoff subsystem which eliminates leaks even though all parts of the invention are to function underwater.

2. Description of the Prior Art

The above noted patent has its generators located underwater in airtight compartments separated from water by seals, which are potential leakage points. As the number of generators used may be large and each generator has its own seal, the number of potential leakage points is also large.

Also, the preferred embodiment shown has a tower that pierces the surface, since the tower design embodies an optional oil-drilling feature. Since the system may also be placed in a river, the tower is subject to damage by ice or passing shipping, and since the seals are fixed to the tower, however indirectly, they are subject to damage from these additional causes. Although a pump is provided for eliminating leakage water, leaks can overwhelm any pumping system.

It is understood that the bag as described in U.S. Pat. No. 5,324,988 will remain rigid in operation. Distortion of the bag upon impact of external forces can cause the bag to leak. This entails a relatively high degree of compression of the water in the bag and a bag material thick enough or of sufficiently high tensile strength (such as kevlar-reinforced nylon) to substantially maintain the shape of the bag. In column 6 line 66 of U.S. Pat. No. 5,324,988 the words "minimal extra (weight) for compression" are used in a relative sense since if an extra 9113 kg. of water is placed in the same walled volume as 195,576,870 kg. of water at 0° C. an extra one atmosphere of pressure will be exerted on the volume's walls. Relatively high compression of the water in the bag must be maintained also because the water in the bag tends to be made to accellerate and decellerate slower than the bag itself causing the above mentioned distortions of shape and consequent leaks as well as a lower angular momentum when the bag is made accellerate or decellerate.

SUMMARY OF THE INVENTION

The invention consists of a tower in two telescopeable sections resting on a river or ocean bottom. Around the larger, upper section of the tower is a large cylindrical plastic bag filled with compressed sea water. The bag is joined to the tower section so it may be revolved horizontally about the tower and ride up and down with the tower section according to impinging forces of currents and internal waves. All parts of the invention lie below the surface. The upper tower section contains a generator whose armature may be made to revolve by the horizontal revolution of the bag surrounding the tower. An air pocket defined by the inner wall of the bag for the sides and top of the air pocket and a new waterline defining the bottom of the air pocket occupies the central part of the volume of the bag. All electrical equipment is located within the air pocket. Waterproof electrical cable from the generator enters the water below the pocket and is led to shore. As the air in the pocket is necessarily compressed the electrical machinery will be designed accordingly. The principal object of the invention is to minimize the possibility of leaks into the electrical machinery which is made to operate underwater. The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

The invention involves the creation of an air pocket below the water line to contain all electrical power generating machinery.

Figure 1:
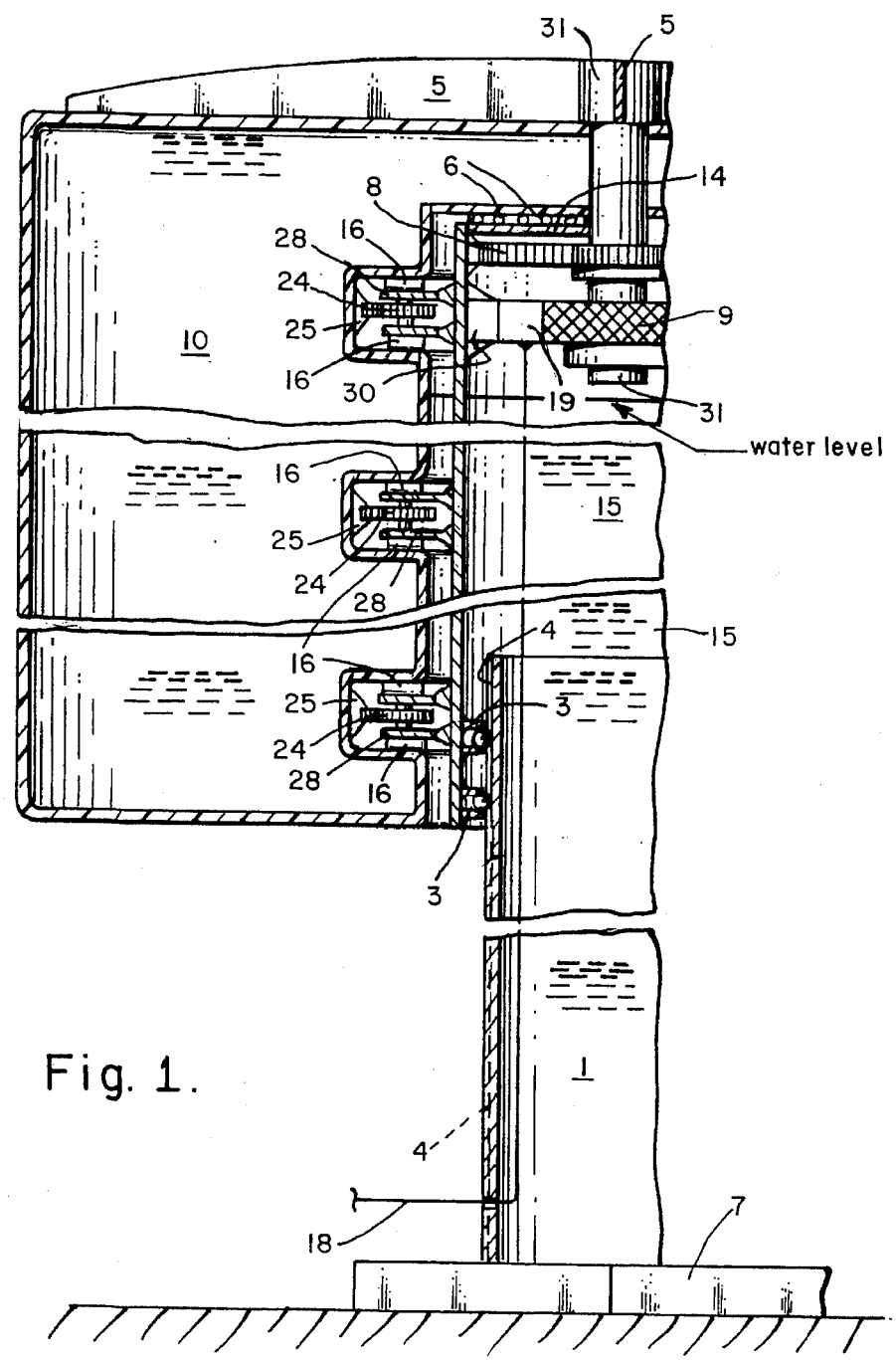
FIG. 1 is a cross-section of the entire invention.
Figure 4:
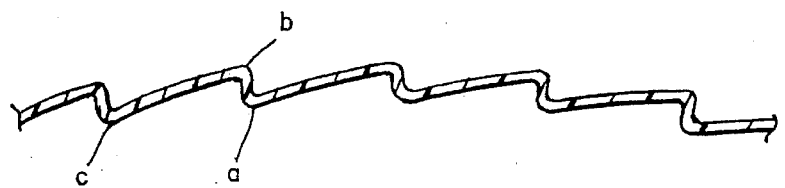
FIG. 4 is a top view of a cross-section of the outer wall of the bag 10 showing the shape of the fins 29.

Turning now to the drawings and more particularly to FIG. 1, there is shown bag 10 filled with compressed water to expand the bag 10. The vertical walls of the bag 10 are formed into ratchet-shaped fins 29. The bag 10 is supported on a support tower assembled in three major parts: a base tube 1 resting on a base 7 which in its turn is fixed to the ocean or river bottom, a larger tube 15 made so as to telescope into the slightly smaller base tube 1, and a top plate 14 fixed to the upper end of the larger tube 15. The lower part of the larger tube 15 is fixed with ball wheel mounts 3, which run in grooves 4 mounted vertically on tower section to prevent horizontal motion of the upper tower. In this configuration, there is a gearing rack 25, around the periphery of the tower section 15, forming a ring, and also a number of levels of rings of restraining gears 24 depending on the overall height of the bag 10.

There is an air pocket whose walls are the inner vertical and horizontal walls of the bag 10 to offset the mass of the bag material and a generator rotor 9 and stator 19 so the bag 10 is buoyant below the surface of the water. The horizontal gear rack 25 fixed to bag 10 engages the tower 15 by meshing with gear 24. Stationary axis 27 around which gear 24 revolves is held by a frame 28 which is fixed to the upper tower 15. Frame 28 is contained by a recess of the bag 10 and provided with rollers 16. The recess extends the circumference of the inner wall of the bag 10. A generator stator 19 is directly attached to the inside wall of the larger tube 15 through struts 30. A generator rotor 9 is indirectly attached to a load spreading unit 5 and solid shaft 31 through an intervening gear transmission 8 so that the rotor 9 will revolve faster than the bag 10. Power take-off from the generator is by cable 18 to the shore. To finish up description of the structure of the invention, there is a ball bearing mount 6 atop the top plate 14 for the bag 10 to rest on since the top plate remains stationary during operation as the bag 10 revolves.

In operation the bag is caused to move both vertically and horizontally by impinging internal waves or currents causing the generator to operate, producing electricity.

a. In vertical operation the bag movement causes the larger tower section 15 to slide up and down outside the base tube 1. As the bag rises water level 12 falls and vise versa. The user must know in advance the projected vertical travel of the bag and upper tower section and design the heights of both tower sections and bag so the projected limits of travel are not exceeded.

b. In horizontal operation currents impinge on the fins 29 to cause the bag 10 to revolve. Gear rack 25 rolls past gears 24 and rollers 16 roll as the surface of the bag touches them allowing the tower to remain stationary horizontally with a minimum of stress.

Figure 2:
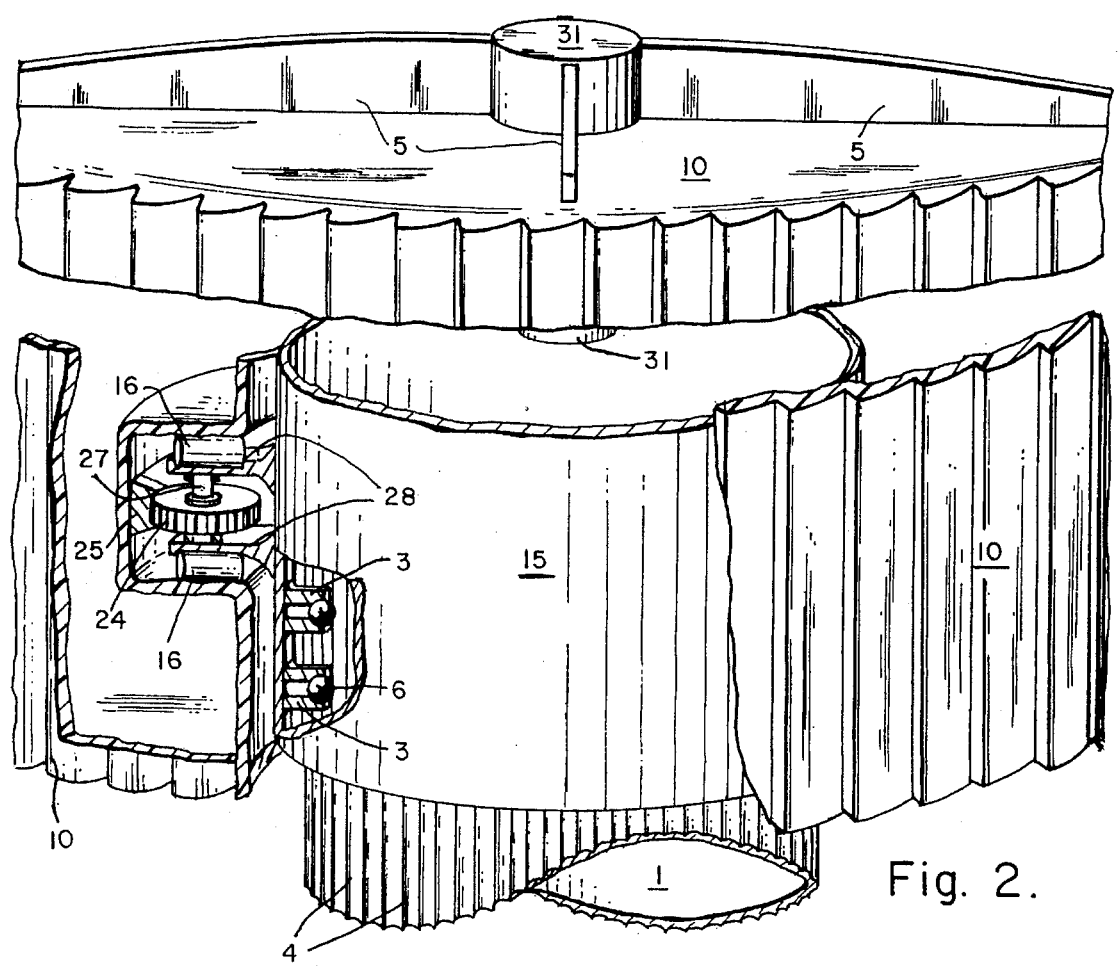
FIG. 2 is a perspective view of the upper section of the tower 15 showing how it is related to the bag 10 surrounding it.
Figure 3:
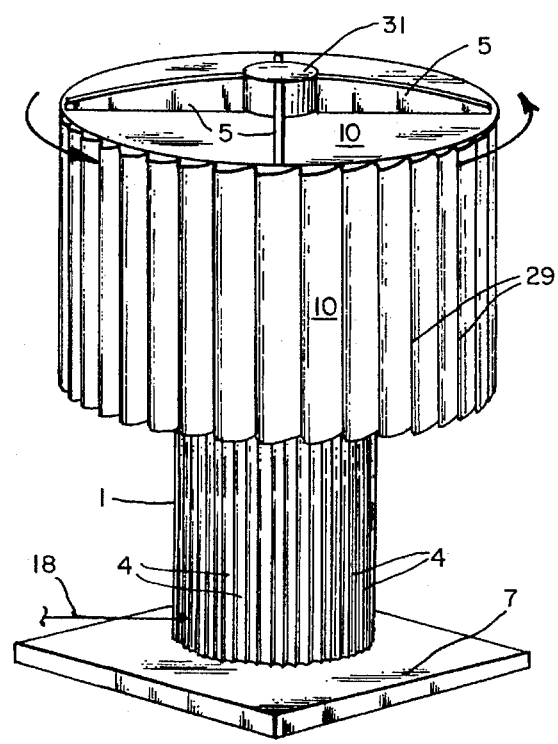
FIG. 3 is a parametric view of the entire invention.

Regarding FIG. 2a,b,c these define a triangular volume of water on the inside of the wall 10. Surface a-b forms a wall along part of a radius line of the bag 10. Force is exerted on the outside of this wall by the passing current and directly pushes the volume of water within the triangle a,b,c at the same rate as the current itself. This shortens the time required for all the water in the bag 10 to accellerate to the same speed as the passing current, less frictional losses. And this further minimizes the possibility of distortion of the bag 10 while in operation, as does highly compressing the water in the bag 10. The bag movement causes the generator rotor 9 to revolve with it but at a faster speed due to the intervention of transmission gears 8. Power take-off is done through wire 18 to the shore. It should be noted that the invention operates better underwater to avoid the sometimes harsh environment of wind-forced waves. But some variation of the invention may be made to operate on the surface or very near the surface as conditions warrant.

In an example for the Detroit River: Assuming a flow rate of 5349 cu. meters/sec., width of 610 meters, depth of 10.66 meters and a velocity of 0.82 meters/sec. the bag 10 would measure 50 meters diameter and be 6 meters deep, with a vertical core hole of 15 meters diameter. The amount of seawater to fill this volume is 11,193,000 KG., plus a minimal amount for compression to stiffen the walls. Regarding the horizontal revolution of the bag, the moment of inertia is:

$$I = \frac{1}{2}mr^2$$

Moment of Inertia=½(11,193,000 KG.)(25)(25)
Therefore I=3,497,812,500 KG. meters.

Assuming the velocity of the impinging waves in some particular second is 0.82 m/sec., this translates into 1/30.5 rad/sec. in this case. Angular momentum for this second would be:

3,497,812,500/30.5=114,682,320 joules=115 megawatts of electric power at 100% efficiency of the invention. Efficiency losses are projected to be about 10% typically.

Also, water velocity through a river channel will be increased where the bag is located. For the Detroit River; assuming a rate of flow of 5332 m³/sec. and a velocity of 0.82 m/s without the presence of the bag:

---
Rate of flow = velocity × cross-sectional area
5332 = .82 × 6502.6
With the presence of the bag:

5332 = (velocity) (6502.6 − 300)
5332 = (velocity) (6302.6)
velocity = .846 m/s.
---

As the bag is revolving at 0.026 m/sec. faster, an extra 3 megawatts is added to the angular momentum. A well placed series of the invention can further increase the possible output of each unit of the invention in a channel.

Output of the invention is projected to be erratic, depending on water velocity, so onshore power storage is recommended. This may be storage batteries, pumped storage, flywheels, etc.

It should now be readily apparent to those skilled in the art that a novel underwater power generation system capable of achieving the stated objects of the invention has been provided. The underwater power generation system of this invention is suitable to be placed not only in the ocean but also in rivers and channels. It is virtually leak-proof and is simpler in construction than the prior art.

It should further be apparent to those skilled in the art that various changes in form and details of the invention may be made. It is intended that such changes be included within the spirit and scope of the claims appended hereto.

What is claimed is:

1. A system for generating electric power from the motion of underwater currents, the system comprising:

a. a tower having multiple telescopeable portions adapted to support a large external structure underwater;

b. a bag which is large and cylindrically shaped and supported centrally and underneath by said tower, said bag being internally stiffened by compressed water to maintain it's shape and configured to produce rotational motion and vertical motion with respect to said tower when impacted by the moving mass of water which surrounds said bag;

c. means interconnecting said tower and bag permitting said bag to move with respect to a moveable section of said tower;

d. single generator means mounted within said tower to convert horizontal motion of said bag to electric power; and e. an air pocket defined by the inner core walls of said bag and on it's bottom by a new water surface itself defined on it's outer edge by the inner walls of said bag to contain said generator in an air environment above said new water surface and support a moveable portion of said telescopeable tower.

2. A system as in claim 1 wherein said tower comprises: several telescopeable tubular sections and a top plate affixed to the top of the topmost said tubular section with a hole in said top plate's center so a shaft may freely pass through said hole.

3. A system as in claim 1 wherein said bag structure comprises: a large nylon bag filled with and held rigid by compressed water, said bag being a vertical cylinder with a closed top and outer surface shaped to form an impeller in order to induce rotary motion when impacted by horizontal water motion, said bag forming at it's center a vertical tube open to said bag's bottom and having a diameter wide enough to fit over said tower with clearance.

4. A system as in claim 1 wherein said generator means comprises: a rotor attached fixedly to said bag at it's rotational axis, a stator fixedly attached to said tower's walls so that as said bag rotates said rotor rotates in respect to said stator for the purpose of producing electric power, and a gear transmission interposed between said bag and said rotor to increase the speed of said rotor in respect to the speed of said bag.

5. A tower as in claim 2 wherein said several telescopeable tubular sections also comprise ball wheel mounts on the lower end of an upper said tubular section and vertical grooves mounted on the next lower said tubular section so as the ball wheels of the upper said tubular section are made to roll vertically through the said grooves mounted on the said lower tubular section, horizontal movement of the said upper tubular section is prevented.

6. A system as in claim 1 wherein said configuration comprises a number of radial walls so that said impaction will directly move a number of volumes of water within said bag in said rotational motion.

\* \* \* \* \*